United States Patent
Ocken et al.

(10) Patent No.: US 10,948,428 B2
(45) Date of Patent: Mar. 16, 2021

(54) REDUCING SCATTER FOR COMPUTED TOMOGRAPHY

(71) Applicant: Delavan Inc., West Des Moines, IA (US)

(72) Inventors: Thomas J. Ocken, Des Moines, IA (US); Joel A. Mohnacky, Roscoe, IL (US)

(73) Assignee: Delavan Inc., West Des Moines, IA (US)

( * ) Notice: Subject to any disclaimer, the term of this patent is extended or adjusted under 35 U.S.C. 154(b) by 148 days.

(21) Appl. No.: 15/989,636

(22) Filed: May 25, 2018

(65) Prior Publication Data

US 2019/0360947 A1 Nov. 28, 2019

(51) Int. Cl.
*G01N 23/046* (2018.01)

(52) U.S. Cl.
CPC .... *G01N 23/046* (2013.01); *G01N 2223/1016* (2013.01); *G01N 2223/316* (2013.01); *G01N 2223/3301* (2013.01); *G01N 2223/3306* (2013.01); *G01N 2223/419* (2013.01); *G01N 2223/5015* (2013.01)

(58) Field of Classification Search
CPC ..... G01N 2223/1016; G01N 2223/316; G01N 2223/3301; G01N 2223/3306; G01N 2223/419; G01N 2223/5015; G01N 23/046

See application file for complete search history.

(56) References Cited

U.S. PATENT DOCUMENTS

| | | | |
|---|---|---|---|
| 4,203,037 A | 5/1980 | Gur et al. | |
| 6,175,609 B1 | 1/2001 | Edic et al. | |
| 6,339,636 B1 | 1/2002 | Ogawa | |
| 9,347,893 B2 | 5/2016 | Nelson et al. | |
| 2003/0156677 A1* | 8/2003 | Francke | G21K 1/025 378/1 |
| 2003/0223547 A1 | 12/2003 | Galish et al. | |

(Continued)

OTHER PUBLICATIONS

Sun, W. W., et al., "An Overview of Industrial X-Ray Computed Tomography", Jan. 31, 2012, pp. 1-55.
(Continued)

*Primary Examiner* — Marcus H Taningco
(74) *Attorney, Agent, or Firm* — Locke Lord LLP; Joshua L. Jones; Scott D. Wofsy

(57) ABSTRACT

A method of computed tomography includes illuminating an object with a cone of illumination, wherein the object is between a source of the cone of illumination and a two-dimensional photo-detector array. The method includes shielding the photodetector array from the collimator shield that includes a slit defined therethrough and moving the slit of the collimator shield across the photodetector array in a direction perpendicular to the slit to expose the photodetector array to the cone of illumination through the slit as the slit scans across the photodetector array to acquire a two-dimensional image of the object. The method includes rotating the object to a new rotational position and repeating movement of the slit to expose the photodetector and rotating the object along the axis until the object has been imaged from multiple rotational positions to form a three-dimensional model of the object.

15 Claims, 2 Drawing Sheets

(56) References Cited

U.S. PATENT DOCUMENTS

| | | | | |
|---|---|---|---|---|
| 2007/0110211 A1* | 5/2007 | Hsieh | ..................... | A61B 6/032 |
| | | | | 378/16 |
| 2011/0128412 A1* | 6/2011 | Milnes | ................... | G02B 27/22 |
| | | | | 348/231.99 |
| 2013/0202087 A1* | 8/2013 | Cox | ...................... | G01N 23/04 |
| | | | | 378/62 |
| 2015/0297156 A1* | 10/2015 | Annis | .................. | A61B 6/0414 |
| | | | | 378/37 |
| 2015/0297158 A1 | 10/2015 | Bothorel et al. | | |
| 2016/0192892 A1* | 7/2016 | Guez | ..................... | A61B 6/486 |
| | | | | 378/148 |
| 2017/0215821 A1 | 8/2017 | Ojelund | | |
| 2018/0177475 A1* | 6/2018 | Koehler | ............... | A61B 6/4035 |
| 2019/0029614 A1* | 1/2019 | Choi | ..................... | G21K 1/046 |
| 2020/0041427 A1* | 2/2020 | Mayo | ..................... | G01N 23/02 |

OTHER PUBLICATIONS

Extended European Search Report dated Nov. 29, 2019, issued during the prosecution of European Patent Application No. EP 19176538.7.

* cited by examiner

REDUCING SCATTER FOR COMPUTED TOMOGRAPHY

BACKGROUND OF THE INVENTION

1. Field of the Invention

The present disclosure relates to computed tomography, and more particularly to reducing scatter in industrial computed tomography, e.g., to improve three-dimensional inspection of precision manufactured parts.

2. Description of Related Art

Industrial computed tomography (CT) scanning traditionally falls into two categories. Linear detector array (LDA) use a planar illumination source coupled with a linear detector array sensor. The sensor records an exposure of each rotational position as the part is repeatedly rotated and imaged. After a full rotation, the illumination source and sensor are moved to the next level on the part, and data for another full rotation is collected. This process is repeated until each level of a part has been scanned. The data can all be utilized to construct a volumetric model of the part. LDA systems reduce scatter by using the linear detector array but take a very long time to scan because if thousands of exposures are recorded at each level, and if there are thousands of levels, then millions of exposures must be recorded and reconciled into a model. The part must typically be rotated thousands of times to form a volumetric model of the part with LDA systems.

Digital detector array (DDA or flat panel) systems use a cone shaped illumination source together with a two-dimensional array of detectors to record a single exposure of the whole part at each rotational position of the part until the part has been imaged for a full rotation of the part. The part only has to rotate once, so DDA systems are much faster at scanning than LDA systems, and the typical number of exposures is reduced by a factor of thousands. But DDA systems have issues with cross-scatter, resulting in scans that can be difficult to resolve or analyze.

For a production CT inspection system, faster scan time is a priority, however x-ray scatter in DDA systems can result in data that is unusable. Traditional approaches to this problem have involved algorithmic compensation that helps resolve the DDA system data, however this also has limitations and ultimately the DDA system data may be unusable even with the algorithmic compensation.

The conventional techniques have been considered satisfactory for their intended purpose. However, with an ongoing increase in the amount and complexity of additively manufactured parts with intricate internal geometries, there is an increasing need for fast, reliable computed tomography that overcomes the limitations of traditional techniques in producing useable data. This disclosure provides a solution for this need.

SUMMARY OF THE INVENTION

A system for computed tomography includes an illuminator configured to form a cone of illumination. A rotational platform within the cone of illumination is configured to rotate an illuminated object about a rotation axis. A two-dimensional photodetector array faces the illuminator, opposite the illuminator from the rotational platform for imaging an object on the rotational platform with illumination from the illuminator. A collimator shield is positioned between the rotational platform and the photodetector array. The collimator shield defines a slit therethrough for exposure of the photodetector array to the cone of illumination only through the slit of the collimator shield. The collimator shield is operatively connected to the photodetector array for movement relative to the photodetector array in a direction perpendicular to the slit for scanning the slit along the photodetector array to acquire a two dimensional image of an object on the rotational platform.

The rotation axis can be aligned with the direction perpendicular to the slit. The collimator shield can extend perpendicularly to the slit in both directions from the slit to an extent that shields the photodetector array from the cone of illumination entirely except for a portion of the cone of illumination passing through the slit even with the slit positioned at extreme ends of the photodetector array. The illuminator can be configured to emit x-ray radiation and the photodetector array can be sensitive to x-ray radiation. The collimator shield can include a pair of spaced apart plates wherein the slit is defined between the plates. The collimator shield can include a respective lead shielding member mounted to each plate. Each plate can include a material that is opaque to x-rays and is sufficiently rigid to maintain constant slot geometry such as flat ground tungsten material. The plates can be spaced apart from one another by a pair of shims, with one of the shims at each end of the slit.

A method of computed tomography includes illuminating an object with a cone of illumination, wherein the object is between a source of the cone of illumination and a two-dimensional photo-detector array. The method includes shielding the photodetector array from the cone of illumination with a collimator shield that includes a slit defined therethrough and moving the slit of the collimator shield across the photodetector array in a direction perpendicular to the slit to expose the photodetector array to the cone of illumination through the slit as the slit scans across the photodetector array to acquire a two-dimensional image of the object. The method includes rotating the object about a rotational axis to a new rotational position and repeating movement of the slit to expose the photodetector and rotating the object along the axis until the object has been imaged from multiple rotational positions to form a three-dimensional model of the object.

Each repetition of movement of the slit can be in a reverse direction from an immediately previous movement of the slit. It is also contemplated that each repetition of movement of the slit can be in the same direction. Illuminating the object can be performed continuously as the slit moves across the photodetector array. Illuminating the object can be performed continuously for multiple rotational positions of the object.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
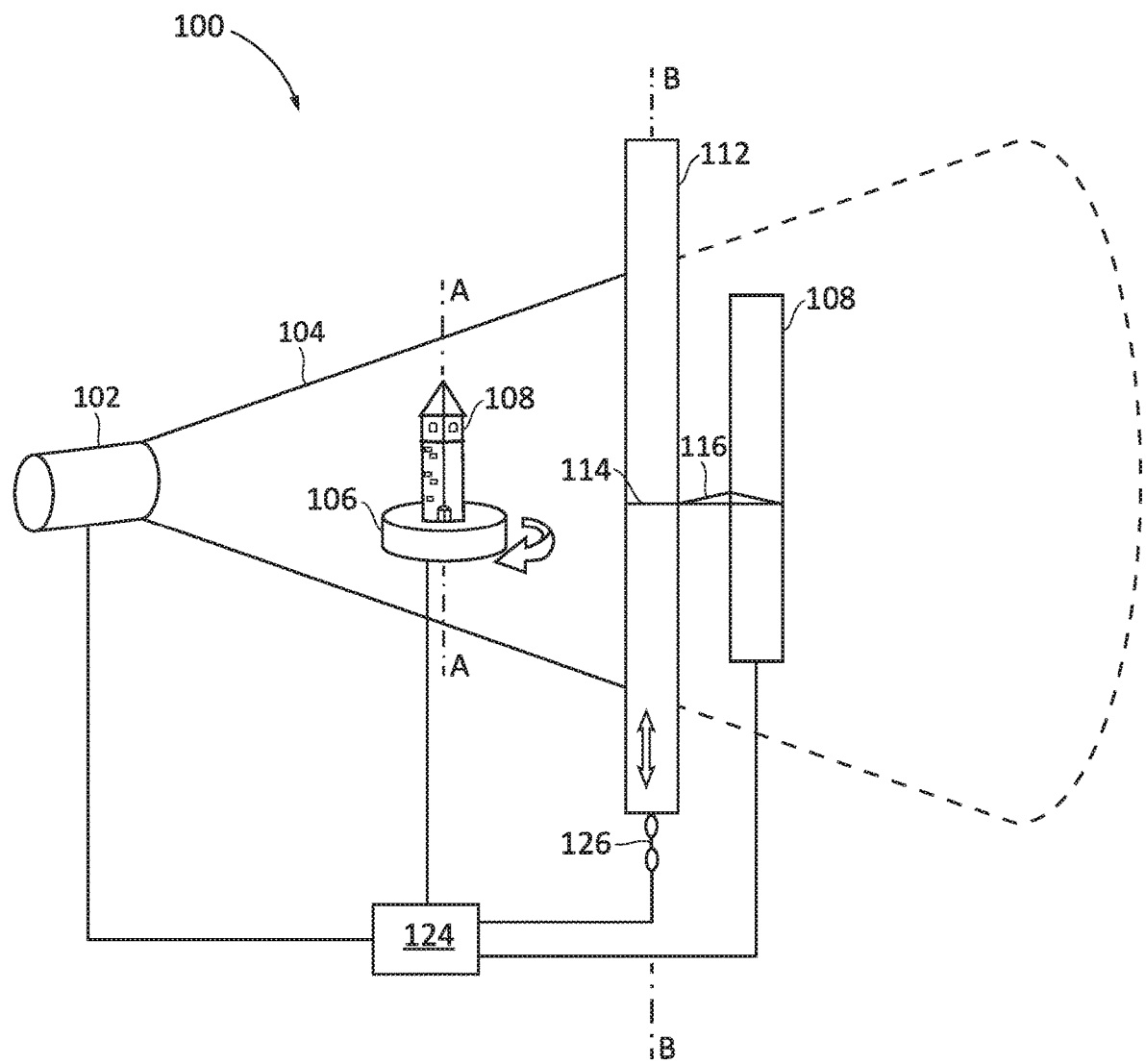
FIG. 1 is a schematic perspective view of an exemplary embodiment of a system for computed tomography constructed in accordance with the present disclosure, showing the object being illuminated, the collimator shield, and the photodetector array.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide fast, reliable scans of objects in computed tomography with reduced scattering relative to traditional systems.

The system 100 for computed tomography includes an illuminator 102 configured to form a cone of illumination 104. A rotational platform 106 within the cone of illumination 104 is configured to rotate an illuminated object 108 about a rotation axis A, as indicated by the curved arrow about axis A in FIG. 1. A two-dimensional photodetector array 110 faces the illuminator 102 and is opposite the illuminator 102 from the rotational platform 106 for imaging the object 108 on the rotational platform 106 with illumination from the illuminator 102. The illuminator 102 is configured to emit x-ray radiation and the photodetector array 108 is sensitive to x-ray radiation, allowing for imaging of internal structures within the object 108 to construct a three-dimensional model of the object 108 that includes internal structure.

A collimator shield 112 is positioned between the rotational platform 106 and the photodetector array 108. The collimator shield 112 defines a slit 114 therethrough for exposure of the photodetector array 108 to the cone of illumination 104 only through the slit 114 of the collimator shield 112. The portion 116 of the cone of illumination 104 that reaches the photodetector array 108 is shown schematically in FIG. 1 and those skilled in the art will readily appreciate that the collimator shield 112 is close enough to the photodetector array 108 to illuminate only a thin strip of the photodetector array 108 as low as a single pixel wide. The collimator shield 112 is operatively connected, e.g., by any suitable mechanical carriage, to the photodetector array 108 for movement relative to the photodetector array 108 in a direction along axis B perpendicular to the slit 114 for scanning the slit 114 along the photodetector array 108 to acquire a two dimensional image of the object 108 on the rotational platform 106. The rotation axis A is aligned parallel with the axis B, which lies in a direction perpendicular to the slit 114.

The collimator shield 112 extends perpendicularly to the slit 114 in both directions, i.e., up and down as oriented in FIG. 1, from the slit 114 to an extent that the collimator shield 112 shields the photodetector array 108 from the cone of illumination 104 entirely except for the portion 116 of the cone of illumination 104 passing through the slit 114, even with the slit 14 positioned at extreme ends of the photodetector array 108, i.e. even with the slit 114 at the top or bottom of the photodetector array 108 as oriented in FIG. 1. The portion of the cone of illumination 104 that is blocked by the collimator shield is indicated schematically in FIG. 1 with broken lines.

Figure 2:
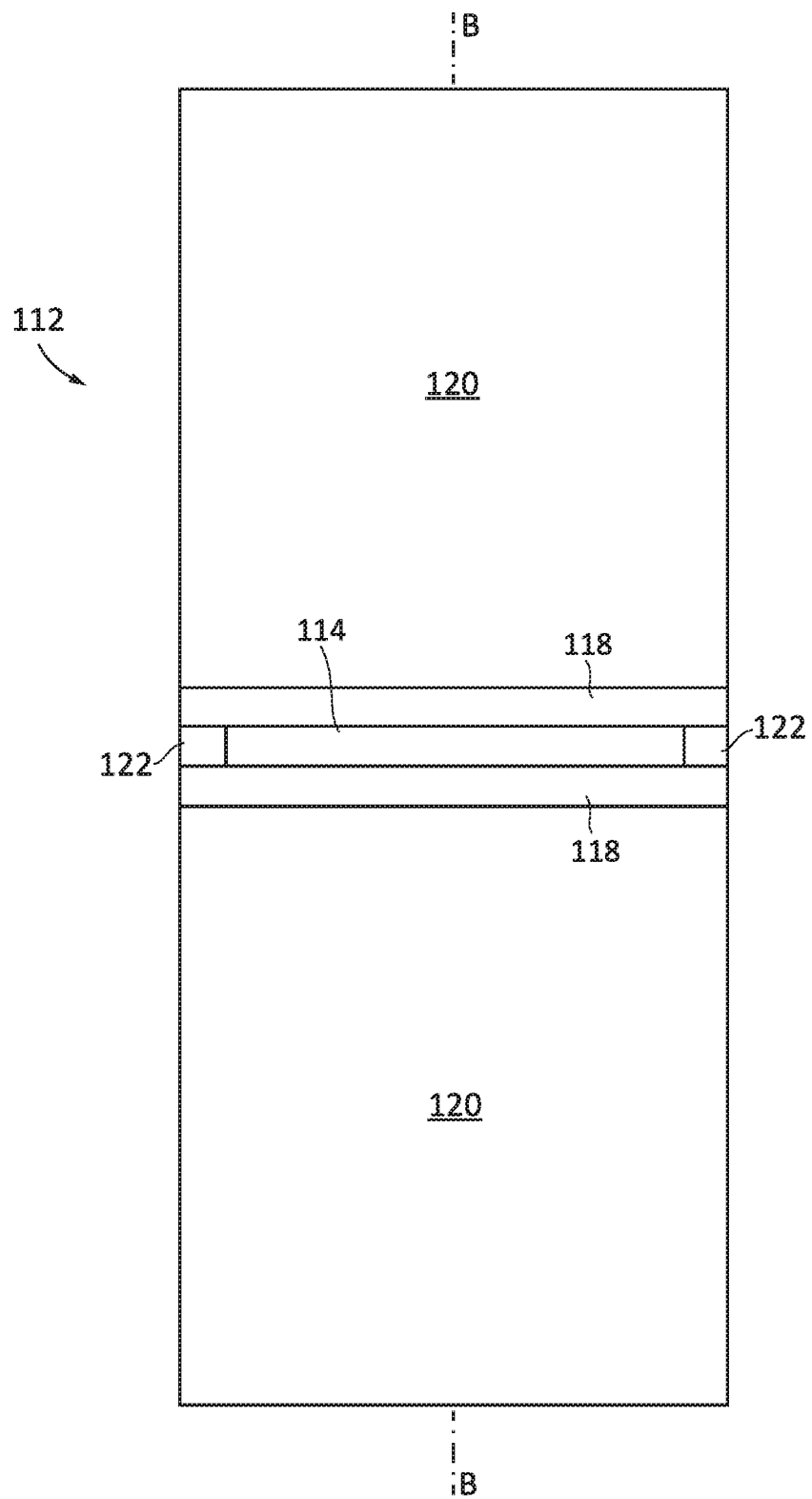
FIG. 2 is a schematic side elevation view, not to any particular scale, of the collimator shield, showing the assembly of plates, shims, and shielding members.

With reference now to FIG. 2, the collimator shield 112 includes a pair of spaced apart plates 118, i.e., spaced apart from one another along axis B, wherein the slit 114 is defined between the plates 118. Each plate can include a flat ground tungsten material or any other suitable material to provide precision for the shape and size of slit 114 as well as opacity to x-rays. The collimator shield 112 includes a respective lead shielding member 120 mounted to each plate 118. Any other suitable material for blocking the illumination can be used. The plates 118 are spaced apart from one another by a pair of shims 122, with one of the shims 122 at each end of the slit 114.

With reference again to FIG. 1, a method of computed tomography includes illuminating an object, e.g., object 108, with a cone of illumination, e.g. cone of illumination 104, wherein the object is between a source, e.g., source 102, of the cone of illumination and a two-dimensional photodetector array, e.g., photodetector array 108. The method includes shielding the photodetector array from cone of illumination with a collimator shield, e.g., collimator shield 112, that includes a slit defined therethrough and moving the slit of the collimator shield across the photodetector array in a direction perpendicular to the slit, as indicated with the double arrow in FIG. 1, to expose the photodetector array to the cone of illumination through the slit as the slit scans across the photodetector array to acquire a two-dimensional image of the object.

The method includes rotating the object to a new rotational position, e.g., by rotating a fraction of a degree around rotational axis A, and then repeating movement of the slit along the length of the photodetector array to expose the photodetector to form another two-dimensional image of the object. After the second image is obtained, the method includes rotating the object about the rotational axis again, scanning with the slit to image the object again, and repeatedly rotating and imaging so forth until the object has been scanned and imaged from multiple rotational positions to form a three-dimensional model of the object through reconstruction software. Software used for volumetric modeling with traditional DDA can be used for this purpose without necessitating the need for new software. Similarly, systems and methods as disclosed herein do not require new acquisition algorithms to acquire images and produce volumetric models therefrom.

A controller 124 can be connected to coordinate movement of the rotational platform 106 and linear movement of the collimating shield 112, e.g., by a linear actuator 126, to control the illuminator 102, and to collect and analyze imaging data from the photodetector array 108. Each repetition of movement of the slit can be in a reverse direction from the immediately previous movement of the slit, e.g., to save time by utilizing travel in both directions of the collimator shield. However, those skilled in the art will readily appreciate that each repetition of movement of the slit 114 can be in the same direction by resetting the position of the slit before each image is obtained. Illuminating the object can be performed continuously as the slit moves across the photodetector array for each image, and illuminating the object can be performed continuously for multiple rotational positions of the object.

The methods and systems of the present disclosure, as described above and shown in the drawings, provide for computed tomography with superior properties including reduced scattering relative to traditional digital detector array (DDA) systems with scan speed greater than that of traditional linear detector array (LDA) systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of computed tomography comprising:
   illuminating an object with a cone of illumination, wherein the object is between a source of the cone of illumination and a two-dimensional photo-detector array;
   shielding the photodetector array from the cone of illumination with a collimator shield that includes a slit defined therethrough;
   moving the slit of the collimator shield across the photodetector array in a direction perpendicular to the slit to expose the photodetector array to the cone of illumination through the slit as the slit scans across the photodetector array to acquire a two-dimensional image of the object;
   rotating the object about a rotational axis to a new rotational position; and
   repeating movement of the slit to expose the photodetector and rotating the object about the rotational axis until the object has been imaged from multiple rotational positions to form a three-dimensional model of the object, wherein rotating the object includes rotating the object wherein the rotational axis is aligned with the direction perpendicular to the slit.

2. The method as recited in claim 1, wherein each repetition of movement of the slit is in a reverse direction from an immediately previous movement of the slit.

3. The method as recited in claim 1, wherein each repetition of movement of the slit is in the same direction.

4. The method as recited in claim 1, wherein illuminating the object is performed continuously as the slit moves across the photodetector array.

5. The method as recited in claim 4, wherein illuminating the object is performed continuously for multiple rotational positions of the object.

6. The method as recited in claim 1, wherein the collimator shield extends perpendicularly to the slit in both directions from the slit to an extent that shields the photodetector array from the cone of illumination entirely except for a portion of the cone of illumination passing through the slit even with the slit positioned at extreme ends of the photodetector array.

7. The method as recited in claim 1, wherein illuminating the object includes illuminating the object with x-ray radiation, wherein the photodetector array is sensitive to x-ray radiation.

8. A system for computed tomography comprising:
   an illuminator configured to form a cone of illumination;
   a rotational platform within the cone of illumination configured to rotate an illuminated object about a rotation axis;
   a two-dimensional photodetector array facing the illuminator, opposite the illuminator from the rotational platform for imaging an object on the rotational platform with illumination from the illuminator; and
   a collimator shield between the rotational platform and the photodetector array, the collimator shield defining a slit therethrough for exposure of the photodetector array to the cone of illumination only through the slit of the collimator shield, wherein the collimator shield is operatively connected to the photodetector array for movement relative to the photodetector array in a direction perpendicular to the slit for scanning the slit along the photodetector array to acquire a two dimensional image of an object on the rotational platform, wherein the rotation axis is aligned with the direction perpendicular to the slit.

9. The system as recited in claim 8, wherein the collimator shield extends perpendicularly to the slit in both directions from the slit to an extent that shields the photodetector array from the cone of illumination entirely except for a portion of the cone of illumination passing through the slit even with the slit positioned at extreme ends of the photodetector array.

10. The system as recited in claim 8, wherein illuminator is configured to emit x-ray radiation and wherein the photodetector array is sensitive to x-ray radiation.

11. The system as recited in claim 8, wherein the collimator shield includes a pair of spaced apart plates wherein the slit is defined between the plates.

12. The system as recited in claim 11, wherein the collimator shield includes a respective lead shielding member mounted to each plate.

13. The system as recited in claim 12, wherein each plate includes a material that is opaque to x-rays and is sufficiently rigid to maintain constant slot geometry.

14. The system as recited in claim 13, wherein each plate includes a flat ground tungsten material.

15. The system as recited in claim 11, wherein the plates are spaced apart from one another by a pair of shims, with one of the shims at each end of the slit.

* * * * *